J. HOTZ.
STALL FLOOR.
APPLICATION FILED MAR. 2, 1921.

1,402,613.

Patented Jan. 3, 1922.

INVENTOR.
Jacob Hotz
BY Nathan Comstock.
ATTORNEY.

UNITED STATES PATENT OFFICE.

JACOB HOTZ, OF ARCADIA, WISCONSIN.

STALL FLOOR.

1,402,613. Specification of Letters Patent. Patented Jan. 3, 1922.

Application filed March 2, 1921. Serial No. 449,065.

*To all whom it may concern:*

Be it known that I, JACOB HOTZ, a citizen of the United States, residing at Arcadia, in the county of Trempealeau and State of Wisconsin, have invented a new and useful Improvement in Stall Floors, of which the following is a specification.

The present invention which is an improvement on that disclosed in Patent No. 1,366,384, for a cow barn gutter grate, granted to me Jan. 25, 1921, relates to stall floors of the conventional type commonly used for dairy cattle, having a platform for the animal to stand or lie upon, and a gutter for the reception of droppings and other offal.

Floors of this kind are usually made with a relatively short platform in order that the gutter may more fully perform its desired functions. As a result of this short platform, the litter or bedding placed thereon to keep the animal clean and comfortable, and to protect it from the hard floor, is knocked and scraped off from the rear portion of the platform by movement of the animal's feet, and there is developed in the animal a tendency to stand with its hind legs in the gutter, thus soiling itself and the platform.

In general it is the object of the present invention, to provide a stall floor which will prevent the animal from soiling itself, maintain it in a clean comfortable condition, and prevent injury to it in lying down, through direct contact with a hard bare floor.

One object of my invention is to retain the bedding or litter on the rear portion of the platform and prevent the animal from standing with its hind legs in the gutter.

It is a further object of the invention to provide means connected with the gutter which will, permit the passage of droppings and other offal, into the gutter, retain the bedding or litter upon the rear portion of the platform, prevent the animal from stepping or standing with its hind feet in the gutter, and break the animal of such habit.

More specifically it is the object of the present invention to provide a stall floor with a grate member for the gutter, arranged to retain the bedding or litter upon the platform, removably held in position by contact with the walls of the gutter and surface of the floor, adjustable for gutters of different widths, and so constructed that the gutter may be readily cleaned without removing the grate.

I attain these and other objects and advantages by the structure illustrated in the accompanying drawing, in which,—

Figure 1:
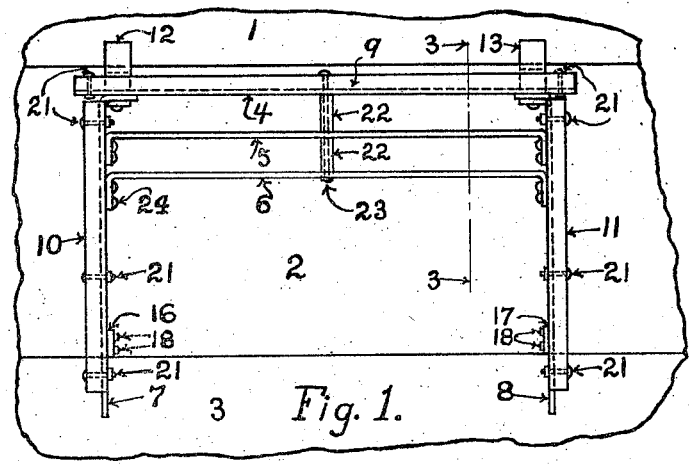
Figures 2, 3:
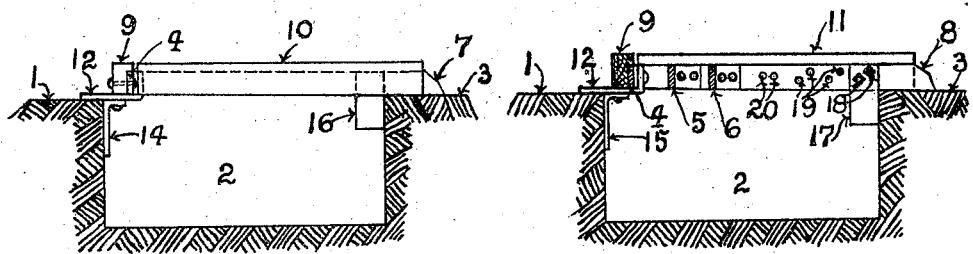
Figure 4:
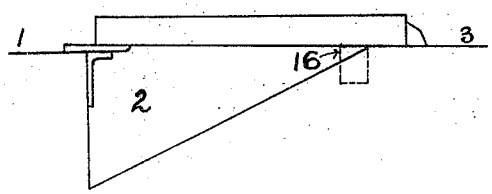

Fig. 1, is a top plan view of a portion of a stall floor with the grate in position in the gutter, Fig. 2, is an end elevation of the grate in position, the floor and gutter being shown in section, Fig. 3, is a section on the line 3—3, Fig. 1, looking in the direction of the arrows, and Fig. 4, is a diagrammatic outline indicating the manner of holding the grate in position when the lugs do not fit against the gutter wall.

Similar numerals refer to similar parts throughout the several views.

In the preferred form of my invention I provide a stall floor comprising a platform 1, a gutter 2, and a floor extension 3, with a grate member, which is placed over the gutter 2 back of the animal, as shown the grate is formed of bars 4, 5, and 6 extending longitudinally of the gutter, these bars are relatively narrow and are spaced sufficiently far apart to permit droppings and other offal to pass easily between them, but close enough to prevent an animal from stepping through the grate. I have shown three of these bars but obviously any desired number may be used. The ends of the bars which may be of any appropriate length are rigidly connected to cross bars 7 and 8 by rivets 24. To prevent any spreading or distortion of the bars 4, 5, and 6, hollow spacers 22, 22, and a through bolt 23 rigidly connecting the bars together at their center are provided.

At opposite corners of the front end of the grate are rigid extensions 12 and 13 adapted to bear upon the platform 1 and support the grate slightly above the surface of the platform, depending from these extensions and rigidly connected therewith are members 14 and 15 adapted to bear against the front wall of the gutter 2 and position the front bar of the grate a slight distance back from the front wall of the gutter.

Secured to the cross bars 7 and 8 by means of bolts 18 are depending members or lugs 16 and 17 which engage the wall of the gutter and co-operate with the members 14 and 15 to hold the grate in position. A series of suitable apertures 19 is provided in the cross bars 7 and 8 whereby the members 16 and 17 may be adjusted for gutters of different widths. Apertures 20 are also provided in the cross bars 7 and 8 so that other grate bars may be added if desired. The cross bars 7 and 8 are made of sufficient length so that their ends extend beyond the rear wall of the gutter and serve to support the rear end of the grate upon the floor 3.

In order to prevent the animal's body from coming in contact with the metal portions of the grate, while lying down, I secure the bar 9, of wood or other material that is a poor conductor of heat against and over the bar 4, as shown in Figures 2 and 3, by means of bolts 21. Bars 10 and 11 are similarly secured to the cross bars 7 and 8 by bolts 21, and serve to prevent an animal from being injured by the forcing of a narrow cross bar into the cleft of its hoof. Obviously the cross bars 7 and 8 may be made wide enough to prevent such injury in any desired manner.

While the grate shown can be removed by merely lifting it from its position across the gutter, it will be noted as clearly shown in Figure 1, that a wide space or recess is left between the cross bars 7 and 8 and the bar 6 and the rear wall of the gutter, and that as may be seen from Figures 2, 3 and 4 the cross bars and grate itself rest upon the surface of the floor wholly above the gutter, so that a shovel or other implement may be easily and freely introduced, and the gutter cleaned without removing the grate.

In use the members 16 and 17 are adjusted to proper position and the grate placed across the gutter back of the animal, and is supported by the extensions and cross bars resting upon the floor. The members 14, 15, 16 and 17 engaging the walls of the gutter hold the grate securely in place, with the bar 4, and the bar 9 secured thereto, spaced slightly above the platform 1 and to the rear of the front wall of the gutter 2. Should the gutter be too small or of a shape that will not permit an engagement of its rear wall by the members 16 and 17, recesses in the floor may be provided as indicated in Figure 4.

When it is in place the grate extends above the platform 1 a distance slightly greater than the height of the bar 9, and serves as a shoulder or border to retain the litter or bedding upon the rear portion of the platform 1, and prevents its being worked off the rear portion by movement of the animal, while any liquids that may fall upon the platform can readily flow through the space provided between it and the bar 9, into the gutter. Should the animal step backwards towards the gutter the narrow grate bars raised above the level of the platform form a rigid but somewhat uncomfortable support, so that it will soon move forward to its proper position in the stall and in time become broken of its tendency to stand in the gutter, and trained to occupy its proper place upon the platform.

The retention of the bedding upon the platform also serves to prevent injury to the animal's body, especially the teats and udder of a dairy cow, which are often seriously injured by direct contact with a hard bare floor.

While I have shown and described a specific floor structure for accomplishing the desired objects, my invention contemplates broadly the use of means operating in the same manner to produce the result desired, and is to be understood as limited only by the state of the art.

I claim:

1. The combination in a stall floor, of a platform having a gutter at its rear, grate means for the gutter projecting above the platform for retaining the bedding or litter thereon.

2. The combination in a stall floor, of a platform having a gutter at its rear, grate means for the gutter, means for supporting the grate upon the platform and floor above the gutter, and means engaging the walls of the gutter to hold the grate in position to retain the bedding or litter upon the platform.

3. The combination in a stall floor, of a platform having a gutter at its rear, a grate for the gutter, means for supporting the grate across the gutter and above the platform so that the front bar of the grate will retain the bedding or litter upon the platform, and means for holding the grate in position.

4. The combination in a stall floor, of a platform having a gutter at its rear, a grate for the gutter having narrow bars and wide spaces, means for supporting the grate above the platform to render standing thereon uncomfortable for an animal and induce it to occupy its proper place upon the platform, and means for holding the grate adjacent the end of the platform with its front bar in position to retain the bedding or litter thereon.

5. The combination in a stall floor, of a platform having a gutter, a grate for the gutter having narrow bars and wide spaces, covering a portion of the width of the gutter, cross bars for the grate extending across the gutter for supporting the grate with its lower side above the level of the platform, the space between the grate bars, cross bars, and rear wall of the gutter providing an aperture for cleaning the gutter without removing the grate.

6. In a grate for stall floor gutters, the combination of narrow bar members widely spaced, cross bars for supporting the grate above the level of the floor, and depending members engaging the walls of the gutter for holding the grate in position.

7. In a grate for stall floor gutters, the combination of bar members, means for supporting the bar members with their lower edges above the level of the floor, and means for engaging the walls of the gutter to hold the grate in position.

8. In a grate for stall floor gutters, the combination of bar members, means for supporting the bar members with their lower edges slightly above and to the rear of the front wall of the gutter, whereby they will serve to prevent the bedding or litter from entering the gutter and permit the passage of liquids and droppings, and means for engaging the walls of the gutter to hold the grate in position.

9. In a grate for stall floor gutters, the combination of narrow bar members widely spaced, cross bars for the bar members adapted to extend across the gutter and rest upon the floor at the rear of the gutter, extensions at the front of the grate adapted to rest upon the surface of the floor and support the lower side of the grate a slight distance above the floor, members depending from the extensions and engaging the front wall of the gutter to position the front bar of the grate slightly behind the front wall of the gutter, and means depending from the cross bars to engage the rear wall of the gutter and hold the grate in position.

10. In a grate for stall floor gutters, the combination of grate bars, cross bars adapted to rest upon the surface of the floor for supporting the grate bars and extending rearwardly therefrom to form a recess in the grate, through which the gutter may be cleaned when the grate is in position, extensions for supporting the front end of the grate with its lower side above the surface of the floor, and depending members to engage the walls of the gutter and hold the grate in position.

11. In a grate for stall floor gutters, the combination of grate bars, cross bars for supporting the grate bars above the surface of the floor and extending rearwardly therefrom to form a recess in the grate through which the gutter may be cleaned when the grate is in position, extensions for supporting the front end of the grate with its lower side above the surface of the floor, depending members to engage the front wall of the gutter, lugs to co-operate with the depending members and hold the grate in position, and means adjustably securing the lugs to the cross bars.

12. In a grate for stall floor gutters, adapted to be supported adjacent the end of the platform to retain the bedding or litter thereon, a grate bar having the portion thereof which comes in contact with the body of the animal while lying down formed of material which is a poor conductor of heat.

13. In a grate for stall floor gutters, the combination of grate bars widely spaced, cross bars for supporting the grate bars, spacers between the grate bars, a bolt passing through the spacers and bars for holding them together, extensions for supporting the front end of the grate, depending members on the extensions for engaging the front wall of the gutter, lugs on the cross bars co-operating with the depending members for holding the grate in position, and means for adjusting the lugs.

14. In a grate for stall floor gutters, the combination of grate bars widely spaced, a member of poor heat conducting material secured to and covering the front bar member, cross bars for supporting the grate bars and extending rearwardly therefrom to form a recess in the grate through which the gutters may be cleaned when the grate is in position, members secured to the cross bars, for preventing them from entering the cleft of an animal's hoof, spacers between the grate bars, a bolt passing through the spacers and bars for holding them together, extensions for supporting the front end of the grate, depending members on the extensions for engaging the front wall of the gutter, lugs on the cross bars co-operating with the depending members for holding the grate in position, and means for adjusting the lugs.

15. The combination in a stall floor, of a platform having a gutter, a grate for the gutter provided with a recess for cleaning the gutter, and means whereby the grate is positioned above the level of the platform for retaining the bedding or litter thereon.

JACOB HOTZ.